US009423290B2

(12) United States Patent
Sakaguchi et al.

(10) Patent No.: US 9,423,290 B2
(45) Date of Patent: Aug. 23, 2016

(54) ABNORMALITY DIAGNOSTIC DEVICE FOR ROLLING BEARING, WIND TURBINE GENERATION APPARATUS AND ABNORMALITY DIAGNOSTIC SYSTEM

(75) Inventors: Tomoya Sakaguchi, Kuwana (JP); Nobuyuki Ninoyu, Shanghai (CN); Junichi Hirata, Iwata (JP); Yasuhiko Sakakibara, Iwata (JP)

(73) Assignee: NTN CORPORATION, Osaka (JP)

( * ) Notice: Subject to any disclaimer, the term of this patent is extended or adjusted under 35 U.S.C. 154(b) by 862 days.

(21) Appl. No.: 13/520,418

(22) PCT Filed: Dec. 24, 2010

(86) PCT No.: PCT/JP2010/073300
§ 371 (c)(1), (2), (4) Date: Jul. 3, 2012

(87) PCT Pub. No.: WO2011/081085
PCT Pub. Date: Jul. 7, 2011

(65) Prior Publication Data
US 2013/0006540 A1 Jan. 3, 2013

(30) Foreign Application Priority Data
Jan. 4, 2010 (JP) ................................ 2010-000070
Dec. 17, 2010 (JP) ................................ 2010-281373

(51) Int. Cl.
*G01H 1/00* (2006.01)
*G01M 13/04* (2006.01)

(52) U.S. Cl.
CPC .............. *G01H 1/003* (2013.01); *F03D 17/00* (2016.05); *F03D 80/70* (2016.05); *G01M 13/045* (2013.01); *F05B 2270/334* (2013.01); *Y02E 10/722* (2013.01)

(58) Field of Classification Search
CPC ............... G01H 1/003; G01M 13/045; F03D 11/0008; F03D 11/0091; F05B 2270/334; Y02E 10/722
See application file for complete search history.

(56) References Cited

U.S. PATENT DOCUMENTS 4,007,630 A * 2/1977 Noda .................. G01M 13/045 73/593
2002/0013635 A1* 1/2002 Gotou ................. G01M 13/045 700/108

(Continued)

FOREIGN PATENT DOCUMENTS

CN 1906473 A 1/2007
JP 58-127142 A 7/1983

(Continued)

OTHER PUBLICATIONS

Mizoguchi, Apr. 19, 2007, Inspection Device, JP2007101244 Machine translation, pp. 1-11.*
Sawara et al., Sep. 7, 2006, Abnormality diagnosis device and abnormality diagnosis method for mechanical equipment, JP2006234785 Machine Translation, pp. 1-32.*

(Continued)

*Primary Examiner* — Mischita Henson
(74) *Attorney, Agent, or Firm* — McDermott Will & Emery LLP

(57) ABSTRACT

An effective value operation unit calculates an effective value of a vibration waveform of a bearing, the vibration waveform being measured by using a vibration sensor. An envelope processing unit performs envelope processing on the vibration waveform measured by using the vibration sensor, thereby generating an envelope waveform of the vibration waveform. An effective value operation unit calculates an effective value of an AC component of the envelope waveform generated by the envelope processing unit. A diagnostic unit diagnoses an abnormality of the bearing based on the effective value of the vibration waveform calculated by the effective value operation unit and the effective value of the AC component of the envelope waveform calculated by the effective value operation unit.

18 Claims, 11 Drawing Sheets

(56) References Cited

U.S. PATENT DOCUMENTS

| | | | | |
|---|---|---|---|---|
| 2008/0234964 | A1* | 9/2008 | Miyasaka | G01H 1/003 702/113 |
| 2011/0125419 | A1* | 5/2011 | Bechhoefer et al. | 702/34 |

FOREIGN PATENT DOCUMENTS

| | | | |
|---|---|---|---|
| JP | 59-212512 | A | 12/1984 |
| JP | 1-152335 | A | 6/1989 |
| JP | 2-205727 | A | 8/1990 |
| JP | 4-089534 | A | 3/1992 |
| JP | 2004-044635 | A | 2/2004 |
| JP | 2005-62154 | A | 3/2005 |
| JP | 2005-147848 | A | 6/2005 |
| JP | 2006-105956 | A | 4/2006 |
| JP | 2006-234785 | A | 9/2006 |
| JP | 2007-101244 | A | 4/2007 |
| JP | 2007-192828 | A | 8/2007 |
| JP | 2008-153010 | A | 7/2008 |
| JP | 2009-243428 | A | 10/2009 |

OTHER PUBLICATIONS

Dr. S. J. Lacey, "An Overview of Bearing Vibration Analysis", Nov. 2008, Maintenance & Asset Management, vol. 23, No. 6, pp. 32-42.*

Brian P. Graney & Ken Starry, "Rolling Element Bearing Analysis", Jan. 2012, Materials Evaluation, vol. 70, No. 1, pp. 78-85.*

Unknown, "Measurement Types in Machinery Monitoring", Feb. 2014, Emerson Process Management—White Paper, pp. 1-20.*

Fatih Camci, Kamal Medjaher, Noureddine Zerhouni and Patrick Nectoux, 2012, "Feature Evaluation for Effective Bearing Prognostics.", Quality and Reliability Engineering International, Wiley pp. 1-15.*

Japanese Office Action issued in corresponding Japanese Application No. 2010-281373, dated Aug. 19, 2014, with English translation.

Chinese Office Action issued in Chinese Application No. 201080060597.9 dated May 6, 2014, w/English translation.

Decision to Grant Patent Japanese Patent Application No. 2010-281373 dated Mar. 10, 2015 with full English translation.

* cited by examiner

ABNORMALITY DIAGNOSTIC DEVICE FOR ROLLING BEARING, WIND TURBINE GENERATION APPARATUS AND ABNORMALITY DIAGNOSTIC SYSTEM

RELATED APPLICATIONS

This application is the U.S. National Phase under 35 U.S.C. §371 of International Application No. PCT/JP2010/073300, filed on Dec. 24, 2010, which in turn claims the benefit of Japanese Application Nos. 2010-000070 filed on Jan. 4, 2010, and 2010-281373filed on Dec. 17, 2010, the disclosures of which Applications are incorporated by reference herein.

TECHNICAL FIELD

The present invention relates to an abnormality diagnostic device for a rolling bearing, a wind turbine generation apparatus and an abnormality diagnostic system, and more particularly relates to an abnormality diagnostic technique for a rolling bearing provided for a main shaft, a gearbox, a generator, or the like of a wind turbine generation apparatus.

BACKGROUND ART

A wind turbine generation apparatus generates electric power by rotating a main shaft connected to a blade that receives wind force, accelerating rotation of the main shaft by a gearbox, and then rotating a rotor of a generator. Each of the main shaft and the rotation shafts of the gearbox and the generator is rotatably supported by a rolling bearing, and an abnormality diagnostic device that diagnoses an abnormality of such a bearing is known.

Japanese Patent Laying-Open No. 2006-105956 (Patent Literature 1) discloses an abnormality diagnostic device that diagnoses an abnormality of a rotating component such as a bearing device. This abnormality diagnostic device is an abnormality diagnostic device that diagnoses an abnormality of a double-row tapered rolling bearing incorporated into a rolling bearing device for a railroad vehicle that relatively rotates with respect to a bearing housing, and includes a drive motor for rotationally driving the double-row tapered rolling bearing and a vibration sensor attached to the bearing housing. At the time of inertial rotation of the double-row tapered rolling bearing within the range of predetermined rotational speeds during power off of the drive motor, an abnormality of the double-row tapered rolling bearing is diagnosed based on a detection signal from the vibration sensor.

According to this abnormality diagnostic device, an abnormality of a rotating component can be diagnosed without disassembling the device in which the rotating component is incorporated, and an erroneous diagnosis under the influence of electric disturbance noise produced by rotation driving means can be prevented to allow a reliable abnormality diagnosis to be performed (see Patent Literature 1).

CITATION LIST

Patent Literature

PTL 1: Japanese Patent Laying-Open No. 2006-105956

SUMMARY OF INVENTION

Technical Problem

In the abnormality diagnostic device disclosed in the above-mentioned Japanese Patent Laying-Open No. 2006-105956, an abnormality determination of the rotating component is made based on the result of frequency analysis of a vibration waveform measured by using the vibration sensor attached to the bearing housing. More specifically, in the rolling bearing, an occurrence cycle of abnormal vibrations produced by damage to the bearing varies depending on a damage occurring position. Therefore, the vibration waveform measured by using the vibration sensor is subjected to a frequency analysis to analyze its peak frequency, thereby identifying presence/absence of abnormality in the bearing and an abnormal portion.

However, with such a technique through the frequency analysis, in the case where, for example, a gearbox is provided as in the above-mentioned wind turbine generation apparatus, a correct abnormality diagnosis cannot be performed in some cases due to mixing of a meshing vibration frequency of gears of the gearbox and/or mixing of natural vibration frequencies of various peripheral components.

The present invention was therefore made to solve this problem, and has an object to provide an abnormality diagnostic device for a rolling bearing, a wind turbine generation apparatus and an abnormality diagnostic system that achieve a more correct abnormality diagnosis.

Solution to Problem

According to the present invention, an abnormality diagnostic device for a rolling bearing includes a vibration sensor for measuring a vibration waveform of the rolling bearing, and a processing unit for diagnosing an abnormality of the rolling bearing. The processing unit includes first and second operation units, an envelope processing unit and a diagnostic unit. The first operation unit calculates an effective value of the vibration waveform measured by using the vibration sensor. The envelope processing unit generates an envelope waveform of the vibration waveform by performing envelope processing on the vibration waveform measured by using the vibration sensor. The second operation unit calculates an effective value of an AC component of the envelope waveform generated by the envelope processing unit. The diagnostic unit diagnoses the abnormality of the rolling bearing based on the effective value of the vibration waveform calculated by the first operation unit and the effective value of the AC component of the envelope waveform calculated by the second operation unit.

Preferably, the abnormality diagnostic device for a rolling bearing further includes a rotation sensor for detecting a rotational speed of one of a shaft supported by the rolling bearing and the rolling bearing. The processing unit further includes a modified vibration degree calculation unit and a modified modulation degree calculation unit. The modified vibration degree calculation unit calculates a modified vibration degree obtained by normalizing, by the rotational speed, the effective value of the vibration waveform calculated by the first operation unit. The modified modulation degree calculation unit calculates a modified modulation degree obtained by normalizing, by the rotational speed, the effective value of the AC component of the envelope waveform calculated by the second operation unit. The diagnostic unit diagnoses the abnormality of the rolling bearing based on the modified vibration degree and the modified modulation degree.

Further preferably, the diagnostic unit diagnoses the abnormality of the rolling bearing based on transition of time changes in the modified vibration degree and the modified modulation degree.

Preferably, the processing unit further includes a frequency analysis unit. The frequency analysis unit performs a frequency analysis on at least one of the vibration waveform and the envelope waveform. The diagnostic unit further presumes an abnormal portion of the rolling bearing based on the result of analysis obtained by the frequency analysis unit.

Preferably, the vibration sensor includes an acceleration sensor.

Preferably, the abnormality diagnostic device for a rolling bearing further includes a displacement sensor for detecting a relative displacement between an inner ring and an outer ring of the rolling bearing. The diagnostic unit diagnoses the abnormality of the rolling bearing by further using a detected value of the displacement sensor.

Still preferably, the abnormality diagnostic device for a rolling bearing further includes an AE sensor for detecting an acoustic emission wave produced from the rolling bearing. The diagnostic unit diagnoses the abnormality of the rolling bearing by further using a detected value of the AE sensor.

Still preferably, the abnormality diagnostic device for a rolling bearing further includes a temperature sensor for measuring the temperature of the rolling bearing. The diagnostic unit diagnoses the abnormality of the rolling bearing by further using a measured value of the temperature sensor.

Still preferably, the abnormality diagnostic device for a rolling bearing further includes a sensor for measuring the amount of impurities contained in a lubricant of the rolling bearing. The diagnostic unit diagnoses the abnormality of the rolling bearing by further using a measured value of the sensor.

Preferably, the abnormality diagnostic device for a rolling bearing further includes a rotation sensor for detecting a rotational speed of one of a shaft supported by the rolling bearing and the rolling bearing. The envelope processing unit includes an absolute value detection unit and an envelope detection unit. The absolute value detection unit outputs an absolute value of the vibration waveform. The envelope detection unit generates the envelope waveform by performing attenuation processing with a predetermined time constant on an output signal from the absolute value detection unit. Herein, the time constant is set based on the rotational speed.

Further preferably, the time constant is set to be less than or equal to a half cycle of rotation of a rolling element in the rolling bearing.

Further preferably, the time constant is set to be more than or equal to 0.5 times the half cycle of the rolling element.

Still preferably, the time constant is set to be less than or equal to a passing cycle of a rolling element relative to a stationary ring of the rolling bearing.

Further preferably, the time constant is set to be more than or equal to 0.5 times the passing cycle of the rolling element.

Moreover, according to the present invention, a wind turbine generation apparatus includes a blade, a main shaft, a gearbox, a generator, a plurality of rolling bearings, and an abnormality diagnostic device. The blade receives wind force. The main shaft is connected to the blade. The gearbox accelerates rotation of the main shaft. The generator is connected to an output shaft of the gearbox. The plurality of rolling bearings are provided in the main shaft, the gearbox and the generator. The abnormality diagnostic device diagnoses an abnormality of at least one of the plurality of rolling bearings. The abnormality diagnostic device includes a vibration sensor for measuring a vibration waveform of a rolling bearing to be diagnosed, and a processing unit for diagnosing an abnormality of the rolling bearing to be diagnosed. The processing unit includes first and second operation units, an envelope processing unit and a diagnostic unit. The first operation unit calculates an effective value of the vibration waveform measured by using the vibration sensor. The envelope processing unit generates an envelope waveform of the vibration waveform by performing envelope processing on the vibration waveform measured by using the vibration sensor. The second operation unit calculates an effective value of an AC component of the envelope waveform generated by the envelope processing unit. The diagnostic unit diagnoses the abnormality of the rolling bearing based on the effective value of the vibration waveform calculated by the first operation unit and the effective value of the AC component of the envelope waveform calculated by the second operation unit.

Moreover, according to the present invention, an abnormality diagnostic system includes a wind turbine generation apparatus, an abnormality diagnostic device and a communications device. The abnormality diagnostic device is provided at a different position from the wind turbine generation apparatus. The communications device establishes communications between the wind turbine generation apparatus and the abnormality diagnostic device. The wind turbine generation apparatus includes a blade, a main shaft, a gearbox, a generator, a plurality of rolling bearings, a vibration sensor, and a data processing unit. The blade receives wind force. The main shaft is connected to the blade. The gearbox accelerates rotation of the main shaft. The generator is connected to an output shaft of the gearbox. The plurality of rolling bearings are provided in the main shaft, the gearbox and the generator. The vibration sensor measures a vibration waveform of at least one of the plurality of rolling bearings. The data processing unit performs primary processing on the vibration waveform measured by using the vibration sensor. The data processing unit includes first and second operation units and an envelope processing unit. The first operation unit calculates an effective value of the vibration waveform measured by using the vibration sensor. The envelope processing unit generates an envelope waveform of the vibration waveform by performing envelope processing on the vibration waveform measured by using the vibration sensor. The second operation unit calculates an effective value of an AC component of the envelope waveform generated by the envelope processing unit. The abnormality diagnostic device diagnoses an abnormality of a rolling bearing to be diagnosed based on the effective value of the vibration waveform and the effective value of the AC component of the envelope waveform received from the data processing unit of the wind turbine generation apparatus through the communications device.

Preferably, the abnormality diagnostic device and the communications device are provided separately from a system monitoring the amount of power generation of the wind turbine generation apparatus.

Preferably, the communications device includes wireless communications in part of a communications route.

Further preferably, the abnormality diagnostic device is connected to the Internet. The communications device includes a wireless communications unit and a communications server. The wireless communications unit is provided in the wind turbine generation apparatus. The communications server is connected to the Internet, and is configured to be capable of wirelessly communicating with the wireless communications unit.

Advantageous Effects of Invention

According to the present invention, since an abnormality of the rolling bearing is diagnosed based on the effective value of the vibration waveform measured by using the vibration sensor and the effective value of the AC component of the envelope waveform generated by performing envelope processing on the vibration waveform measured by using the vibration sensor, a more correct abnormality diagnosis can be achieved than in a conventional technique through a frequency analysis. In addition, unnecessary maintenance can be eliminated, so that the cost required for maintenance can be reduced.

DESCRIPTION OF EMBODIMENTS

Figure 1:
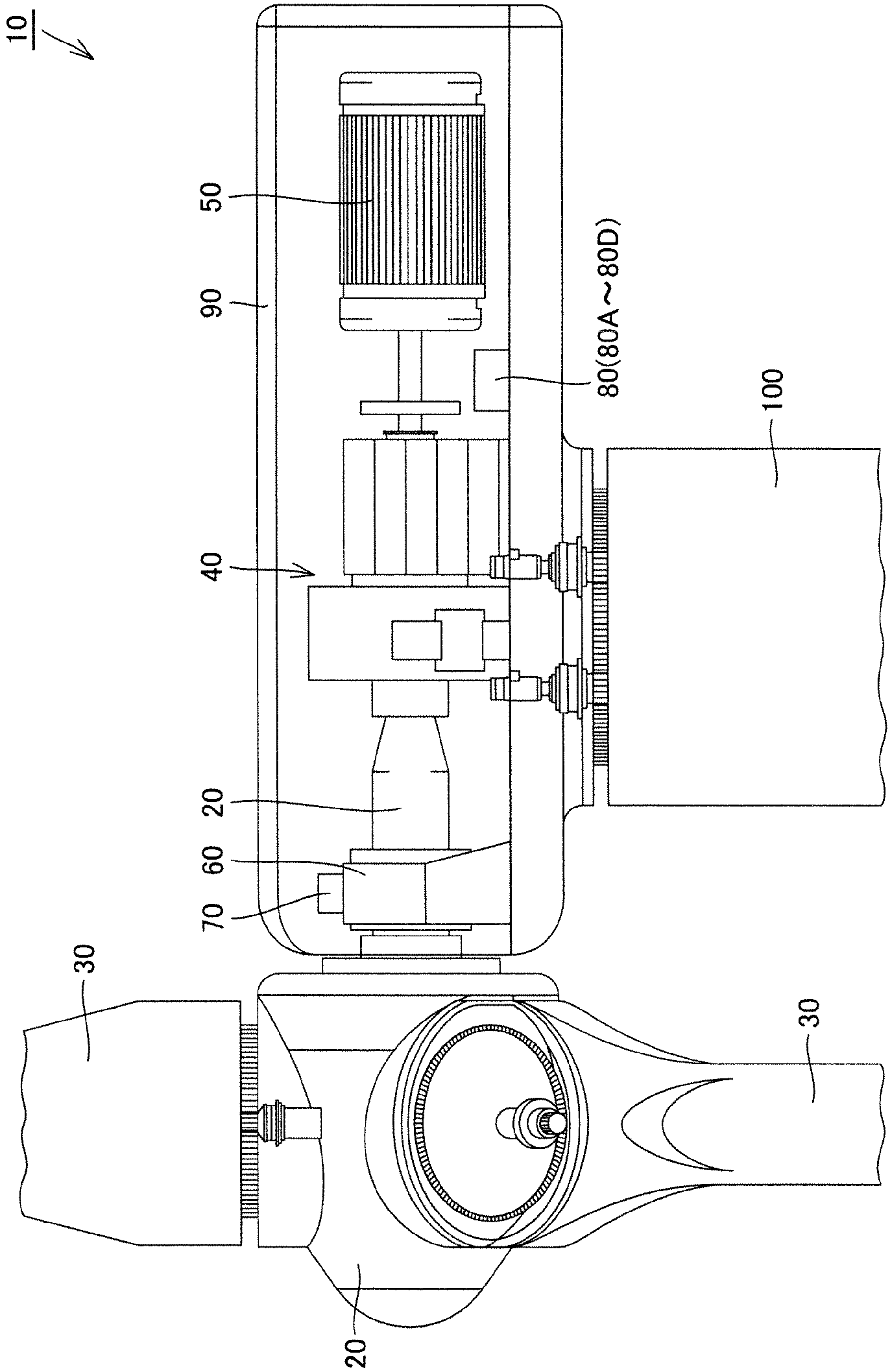
FIG. 1 is a diagram schematically showing the structure of a wind turbine generation apparatus to which an abnormality diagnostic device for a rolling bearing according to a first embodiment of the present invention is applied.

Embodiments of the present invention will be described in detail below with reference to the drawings. It is noted that, in the drawings, the same or corresponding portions have the same reference characters allotted, and description thereof will not be repeated.

[First Embodiment]

FIG. 1 is a diagram schematically showing the structure of a wind turbine generation apparatus to which an abnormality diagnostic device for a rolling bearing according to a first embodiment of this invention is applied. Referring to FIG. 1, a wind turbine generation apparatus 10 includes a main shaft 20, a blade 30, a gearbox 40, a generator 50, a main shaft bearing (hereinafter simply referred to as a "bearing") 60, a vibration sensor 70, and a data processing device 80. Gearbox 40, generator 50, bearing 60, vibration sensor 70, and data processing device 80 are stored in a nacelle 90, and nacelle 90 is supported by a tower 100.

Main shaft 20 enters nacelle 90 to be connected to an input shaft of gearbox 40, and is rotatably supported by bearing 60. Main shaft 20 transmits rotating torque produced by blade 30 having received wind force, to the input shaft of gearbox 40. Blade 30 is provided at the leading end of main shaft 20, and converts wind force into rotating torque for transmission to main shaft 20.

Bearing 60 is secured within nacelle 90, and supports main shaft 20 rotatably. Bearing 60 is implemented by a rolling bearing, and, for example, implemented by a self-aligning rolling bearing, a tapered rolling bearing, a cylindrical rolling bearing, a ball bearing, or the like. It is noted that these bearings may be of either a single-row or double-row type. Vibration sensor 70 is secured to bearing 60. Vibration sensor 70 detects vibrations of bearing 60, and outputs a detected value to data processing device 80. Vibration sensor 70 is implemented by, for example, an acceleration sensor in which a piezoelectric device is used.

Gearbox 40 is provided between main shaft 20 and generator 50, and increases the rotational speed of main shaft 20 for output to generator 50. As an example, gearbox 40 is implemented by a gearbox mechanism including a planetary gear, an intermediate shaft, a high speed shaft, and the like. It is noted that, although not particularly shown, a plurality of bearings rotatably supporting a plurality of shafts are also provided in this gearbox 40. Generator 50 is connected to the output shaft of gearbox 40, and generates power by means of rotating torque received from gearbox 40. Generator 50 is implemented by an induction generator, for example. It is noted that a bearing rotatably supporting a rotor is also provided in this generator 50.

Data processing device 80 is provided in nacelle 90, and receives the detected value of vibrations of bearing 60 from vibration sensor 70. Data processing device 80 then diagnoses abnormality of bearing 60 in accordance with a previously set program by a method which will be described later using a vibration waveform of bearing 60.

Figure 2:
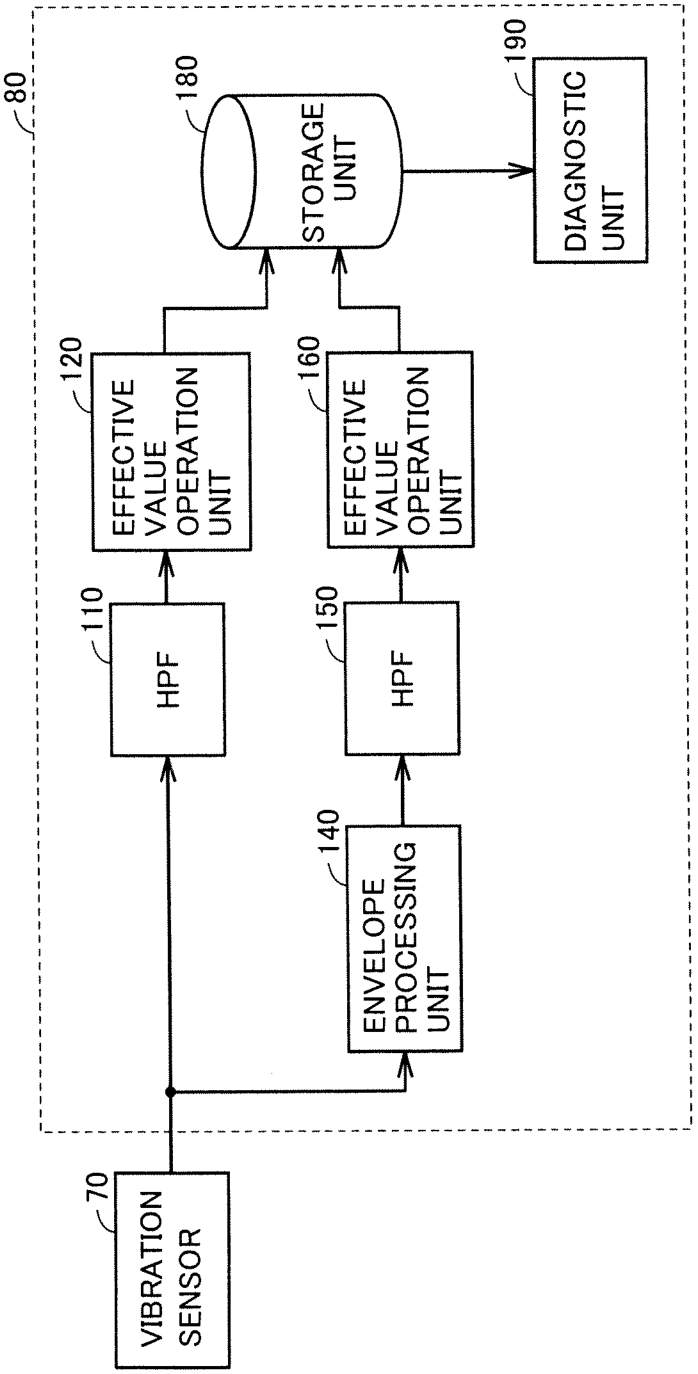
FIG. 2 is a functional block diagram functionally showing the configuration of a data processing device shown in FIG. 1.

FIG. 2 is a functional block diagram functionally showing the configuration of data processing device 80 shown in FIG. 1. Referring to FIG. 2, data processing device 80 includes high pass filters (hereinafter referred to as "HPF (High Pass Filter)") 110 and 150, effective value operation units 120 and 160, an envelope processing unit 140, a storage unit 180, and a diagnostic unit 190.

HPF 110 receives the detected value of vibrations of bearing 60 from vibration sensor 70. For the received detection signal, HPF 110 passes a signal component higher than a predetermined frequency, and blocks a low frequency component. This HPF 110 is provided for removing a DC component included in the vibration waveform of bearing 60. It is noted that, if the output from vibration sensor 70 does not include a DC component, HPF 110 may be omitted.

Effective value operation unit 120 receives, from HPF 110, the vibration waveform of bearing 60 with a DC component removed therefrom. Effective value operation unit 120 then calculates an effective value (also referred to as a "RMS (Root Mean Square) value") of the vibration waveform of bearing 60, and outputs the calculated effective value of the vibration waveform to storage unit 180.

Envelope processing unit 140 receives the detected value of vibrations of bearing 60 from vibration sensor 70. Envelope processing unit 140 then performs envelope processing on the received detection signal, thereby generating an envelope waveform of the vibration waveform of bearing 60. It is noted that various publicly-known techniques are applicable to the envelope processing operated in envelope processing unit 140, and as an example, the vibration waveform of bearing 60 measured by using vibration sensor 70 is rectified into an absolute value and is passed through a low pass filter (LPF), thereby generating the envelope waveform of the vibration waveform of bearing 60.

HPF 150 receives the envelope waveform of the vibration waveform of bearing 60 from envelope processing unit 140. For the received envelope waveform, HPF 150 passes a signal component higher than a predetermined frequency, and blocks a low frequency component. This HPF 150 is provided for removing a DC component included in the envelope waveform and extracting an AC component of the envelope waveform.

Effective value operation unit 160 receives, from HPF 150, the envelope waveform with a DC component removed therefrom, i.e., an AC component of the envelope waveform. Effective value operation unit 160 then calculates an effective value (RMS value) of the received AC component of the envelope waveform, and outputs the calculated effective value of the AC component of the envelope waveform to storage unit 180.

Storage unit 180 synchronizes and momentarily stores the effective value of the vibration waveform of bearing 60 calculated by effective value operation unit 120 and the effective value of the AC component of the envelope waveform calculated by effective value operation unit 160. This storage unit 180 is implemented by, for example, a readable and writable nonvolatile memory or the like.

Diagnostic unit 190 reads, from storage unit 180, the effective value of the vibration waveform of bearing 60 and the effective value of the AC component of the envelope waveform momentarily stored in storage unit 180, and diagnoses an abnormality of bearing 60 based on the read two effective values. In detail, diagnostic unit 190 diagnoses an abnormality of bearing 60 based on transition of time changes in the effective value of the vibration waveform of bearing 60 and the effective value of the AC component of the envelope waveform.

That is, the effective value of the vibration waveform of bearing 60 calculated by effective value operation unit 120 is an effective value of a raw vibration waveform not having been subjected to envelope processing, and therefore, for example, less increases in value in the case of impulse vibrations whose amplitude increases only when a rolling element passes over a position of delamination if delamination occurs partly in a raceway, but increases greatly in value in the case of continuous vibrations occurring at the time of surface roughness and/or poor lubrication of a contact area between the raceway and the rolling element.

On the other hand, the effective value of the AC component of the envelope waveform calculated by effective value operation unit 160 less increases in value in the case of continuous vibrations occurring at the time of surface roughness and/or poor lubrication of the raceway or does not increase depending on the case, but increases greatly in value in the case of impulse vibrations. Therefore, in this first embodiment, by using the effective value of the vibration waveform of bearing 60 and the effective value of the AC component of the envelope waveform, an abnormality that could not be detected only with either effective value can be detected, so that a more correct abnormality diagnosis can be achieved.

FIGS. 3 to 6 are diagrams each showing a vibration waveform of bearing 60 measured by using vibration sensor 70. It is noted that the vibration waveforms when the rotational speed of main shaft 20 (FIG. 1) is constant are shown in FIGS. 3 to 6.

Figure 3:
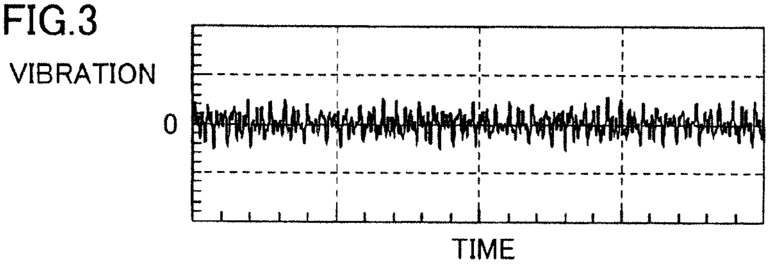
FIG. 3 is a diagram showing a vibration waveform of a bearing when no abnormality occurs in the bearing.

FIG. 3 is a diagram showing the vibration waveform of bearing 60 when no abnormality occurs in bearing 60. Referring to FIG. 3, the horizontal axis indicates the time, and the vertical axis indicates the vibration degree representing the magnitude of vibrations.

Figure 4:
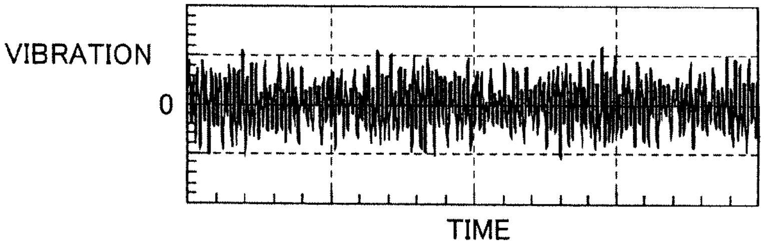
FIG. 4 is a diagram showing a vibration waveform of the bearing seen when surface roughness and/or poor lubrication occur in a raceway of the bearing.

FIG. 4 is a diagram showing the vibration waveform of bearing 60 seen when surface roughness and/or poor lubrication occur in the raceway of bearing 60. Referring to FIG. 4, if surface roughness and/or poor lubrication of the raceway occur, vibrations increase, and the state where vibrations have increased occurs continuously. No remarkable peak occurs in the vibration waveform. Therefore, for such a vibration waveform, as compared with the effective value of the vibration waveform (output of effective value operation unit 120 (FIG. 2)) and the effective value of the AC component of the envelope waveform (output of effective value operation unit 160 (FIG. 2)) when no abnormality occurs in bearing 60, the effective value of a raw vibration waveform not having been subjected to envelope processing increases and the effective value of the AC component of the envelope waveform less increases.

Figure 5:
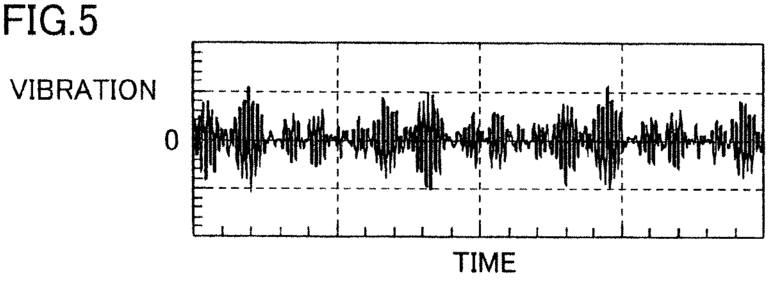
FIG. 5 is a diagram showing a vibration waveform of the bearing in an initial stage when delamination occurs in the raceway of the bearing.

FIG. 5 is a diagram showing the vibration waveform of bearing 60 in an initial stage when delamination occurs in the raceway of bearing 60. Referring to FIG. 5, the initial stage of delamination abnormality is a state where delamination occurs partly in the raceway, and since strong vibrations occur when the rolling element passes over the position of delamination, pulsed vibrations occur periodically in accordance with rotation of the shaft. While the rolling element is passing over positions other than the position of delamination, vibrations less increase. Therefore, for such a vibration waveform, the effective value of the AC component of the envelope waveform increases and the effective value of a raw vibration waveform not having been subjected to envelope processing less increases, as compared with the effective value of the vibration waveform and the effective value of the AC component of the envelope waveform when no abnormality occurs in bearing 60.

Figure 6:
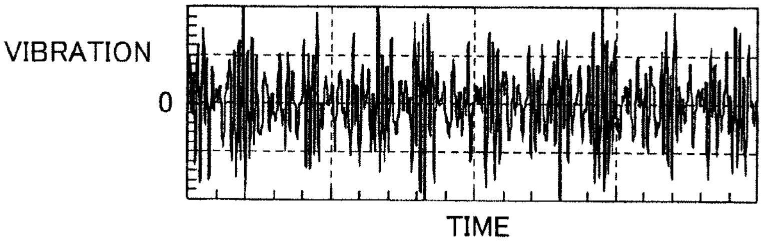
FIG. 6 is a diagram showing a vibration waveform of the bearing seen in a terminal stage of delamination abnormality.

FIG. 6 is a diagram showing the vibration waveform of bearing 60 seen in a terminal stage of delamination abnormality. Referring to FIG. 6, the terminal stage of delamination abnormality is a state where delamination is transferred all over the raceway, and vibrations increase as a whole, and a tendency to pulsed vibrations is weakened as compared to the initial stage of abnormality. Therefore, for such a vibration waveform, the effective value of a raw vibration waveform increases and the effective value of the AC component of the envelope waveform decreases, as compared with the effective value of the vibration waveform and the effective value of the AC component of the envelope waveform in the initial stage of delamination abnormality.

Figure 7:
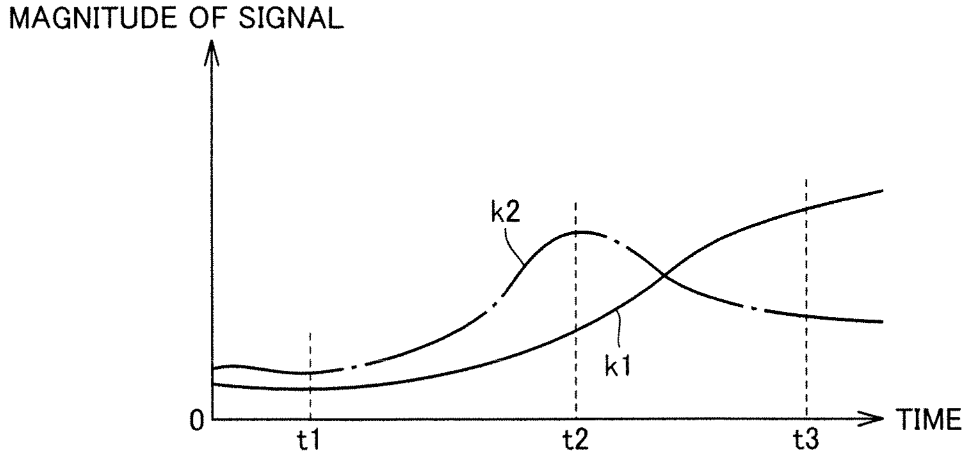
FIG. 7 is a diagram showing time changes in an effective value of a vibration waveform of the bearing and an effective value of an AC component of an envelope waveform obtained when delamination occurs partly in the raceway of the bearing and delamination is then transferred all over the raceway.
Figure 8:
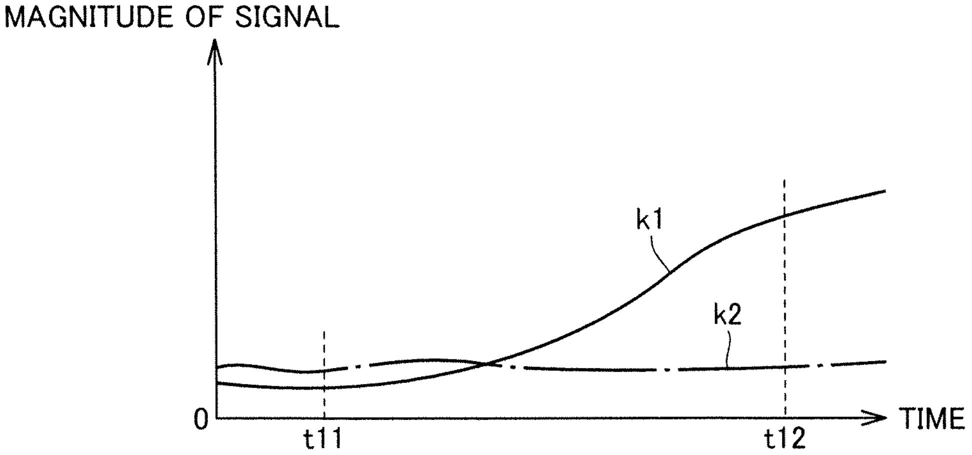
FIG. 8 is a diagram showing time changes in an effective value of a vibration waveform of the bearing and an effective value of an AC component of an envelope waveform obtained when surface roughness and/or poor lubrication of the raceway of the bearing occur.

FIG. 7 is a diagram showing time changes in the effective value of the vibration waveform of bearing 60 and the effective value of the AC component of the envelope waveform when delamination occurs partly in the raceway of bearing 60 and is then transferred all over the raceway. It is noted that time changes in each effective value when the rotational speed of main shaft 20 is constant are shown in FIG. 7 and FIG. 8 which will be described later.

Referring to FIG. 7, a curve k1 represents time changes in the effective value of the vibration waveform not having been subjected to envelope processing, and a curve k2 represents time changes in the effective value of the AC component of the envelope waveform. At time t1 before delamination occurs, the effective value (k1) of the vibration waveform and the effective value (k2) of the AC component of the envelope waveform are both small. It is noted that the vibration waveform at time t1 will be a waveform as shown in above-mentioned FIG. 3.

When delamination occurs partly in the raceway of bearing 60, the effective value (k2) of the AC component of the envelope waveform increases greatly, and on the other hand, the effective value (k1) of the vibration waveform not having been subjected to envelope processing less increases (around time t2), as described with reference to FIG. 5.

Further, when delamination is then transferred thereafter all over the raceway, the effective value (k1) of the vibration waveform not having been subjected to envelope processing increases greatly, and on the other hand, the effective value (k2) of the AC component of the envelope waveform decreases (around time t3), as described with reference to FIG. 6.

FIG. 8 is a diagram showing time changes in the effective value of the vibration waveform of bearing 60 and the effective value of the AC component of the envelope waveform when surface roughness and/or poor lubrication of the raceway of bearing 60 occur. Referring to FIG. 8, curve k1 represents time changes in the effective value of the vibration waveform not having been subjected to envelope processing, and curve k2 represents time changes in the effective value of the AC component of the envelope waveform, similarly to FIG. 7.

At time t11 before surface roughness and/or poor lubrication of the raceway occur, the effective value (k1) of the vibration waveform and the effective value (k2) of the AC component of the envelope waveform are both small. It is noted that the vibration waveform at time t11 will be a waveform as shown in above-mentioned FIG. 3.

When surface roughness and/or poor lubrication of the raceway of bearing 60 occur, the effective value (k1) of the vibration waveform not having been subjected to envelope processing increases, and on the other hand, an increase in the effective value (k2) of the AC component of the envelope waveform is not seen (around time t12), as described with reference to FIG. 4.

In this way, an abnormality diagnosis of bearing 60 can be performed more correctly based on the transition of time changes in the effective value (k1) of the raw vibration waveform not having been subjected to envelope processing and the effective value (k2) of the AC component of the envelope waveform.

As described above, according to this first embodiment, since an abnormality of bearing 60 is diagnosed based on the effective value of the vibration waveform of bearing 60 measured by using vibration sensor 70 and the effective value of the AC component of the envelope waveform generated by performing envelope processing on the vibration waveform measured by using vibration sensor 70, a more correct abnormality diagnosis can be achieved than in the conventional technique through a frequency analysis. In addition, unnecessary maintenance can be eliminated, so that the cost required for maintenance can be reduced.

[Second Embodiment]

When the rotational speed of main shaft 20 (FIG. 1) changes, the magnitude of vibrations of bearing 60 changes. Generally, vibrations of bearing 60 increase as the rotational speed of main shaft 20 increases. Therefore, in this second embodiment, each of the effective value of the vibration waveform of bearing 60 and the effective value of the AC component of the envelope waveform is normalized by the rotational speed of main shaft 20, and an abnormality diagnosis of bearing 60 is performed using each normalized effective value.

The overall structure of a wind turbine generation apparatus in this second embodiment is the same as the structure of the first embodiment shown in FIG. 1.

Figure 9:
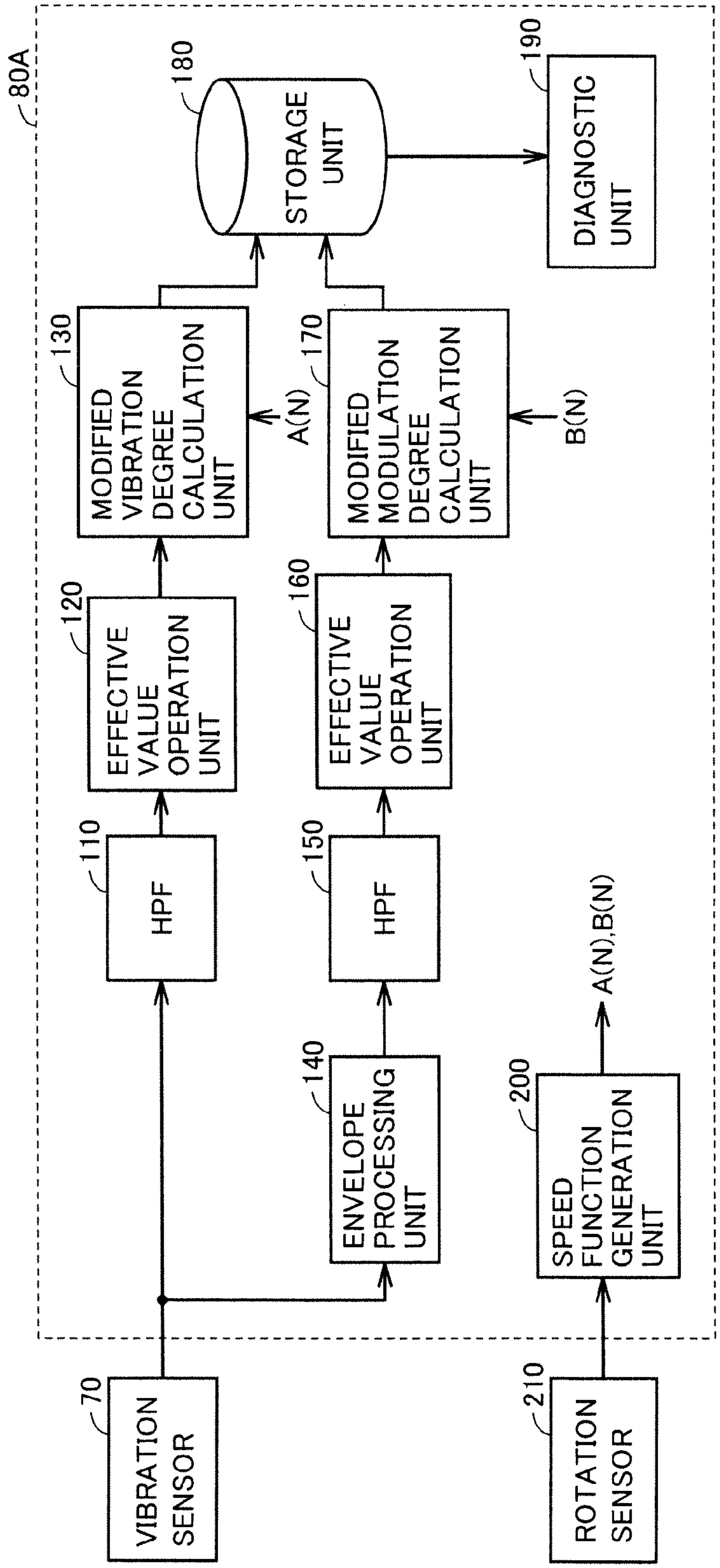
FIG. 9 is a functional block diagram functionally showing the configuration of a data processing device in a second embodiment.

FIG. 9 is a functional block diagram functionally showing the configuration of a data processing device 80A in the second embodiment. Referring to FIG. 9, data processing device 80A further includes a modified vibration degree calculation unit 130, a modified modulation degree calculation unit 170 and a speed function generation unit 200 in the configuration of data processing device 80 in the first embodiment shown in FIG. 2.

Speed function generation unit 200 receives a detected value of the rotational speed of main shaft 20 obtained by a rotation sensor 210 (not shown in FIG. 1). It may be configured that rotation sensor 210 outputs a detected value of the rotational position of main shaft 20 and the rotational speed of main shaft 20 is calculated in speed function generation unit 200. Speed function generation unit 200 generates a speed function A(N) for normalizing, by a rotational speed N of main shaft 20, the effective value of the vibration waveform of bearing 60 calculated by effective value operation unit 120 and a speed function B(N) for normalizing, by rotational speed N of main shaft 20, the effective value of the AC component of the envelope waveform calculated by effective value operation unit 160. As an example, speed functions A(N) and B(N) are expressed by the following expressions:

$$A(N)=a\times N^{-0.5} \quad (1)$$

$$B(N)=b\times N^{-0.5} \quad (2)$$

Herein, a and b are constants previously determined by an experiment or the like, which may be different values or the same value.

Modified vibration degree calculation unit 130 receives the effective value of the vibration waveform of bearing 60 from effective value operation unit 120, and receives speed function A(N) from speed function generation unit 200. Modified vibration degree calculation unit 130 then uses speed function A(N) to calculate a value (hereinafter referred to as a "modified vibration degree") obtained by normalizing, by the rotational speed of main shaft 20, the effective value of the vibration waveform calculated by effective value operation unit 120. Specifically, a modified vibration degree Vr* is calculated by the following expression using an effective value Vr of the vibration waveform calculated by effective value operation unit 120 and speed function A(N).

[Expression 1]

$$Vr^* = A(N)\sqrt{\frac{\int_0^T \{Vr(t) - Vra\}^2\, dt}{T}} \quad (3)$$

Herein, Vra indicates the average value of Vr from time 0 to T.

Modified vibration degree calculation unit 130 then outputs modified vibration degree Vr* calculated by the expression (3) to storage unit 180.

Modified modulation degree calculation unit 170 receives the effective value of the AC component of the envelope waveform from effective value operation unit 160, and receives speed function B(N) from speed function generation unit 200. Modified modulation degree calculation unit 170 then uses speed function B(N) to calculate a value (hereinafter referred to as a "modified modulation degree") obtained by normalizing, by the rotational speed of main shaft 20, the effective value of the AC component of the envelope waveform calculated by effective value operation unit 160. Specifically, a modified modulation degree Ve* is calculated by the following expression using an effective value Ve of the AC component of the envelope waveform calculated by effective value operation unit 160 and speed function B(N).

[Expression 2]

$$Ve^* = B(N)\sqrt{\frac{\int_0^T \{Ve(t) - Vea\}^2\, dt}{T}} \quad (4)$$

Herein, Vea indicates the average value of Ve from time 0 to T. Modified modulation degree calculation unit 170 outputs modified modulation degree Ve* calculated by the expression (4) to storage unit 180.

Then, modified vibration degree Vr* and modified modulation degree Ve* stored momentarily in storage unit 180 are read by diagnostic unit 190, and an abnormality diagnosis of bearing 60 is performed by diagnostic unit 190 based on transition of time changes in modified vibration degree Vr* and modified modulation degree Ve* having been read.

It is noted that, in the above description, rotation sensor 210 may be attached to main shaft 20, or a rotation sensor-equipped bearing in which rotation sensor 210 is incorporated into bearing 60 may be used as bearing 60.

As described above, according to this second embodiment, since an abnormality is diagnosed based on modified vibration degree Vr* obtained by normalizing the effective value of the vibration waveform of bearing 60 by the rotational speed and modified modulation degree Ve* obtained by normalizing the effective value of the AC component of the envelope waveform by the rotational speed, a disturbance due to variations in rotational speed is eliminated, so that a more correct abnormality diagnosis can be achieved.

[Third Embodiment]

In this third embodiment, to perform a further correct abnormality diagnosis, an abnormality diagnosis through a frequency analysis is used together with the above-described first or second embodiment.

The whole structure of a wind turbine generation apparatus in this third embodiment is the same as that of wind turbine generation apparatus 10 shown in FIG. 1.

Figure 10:
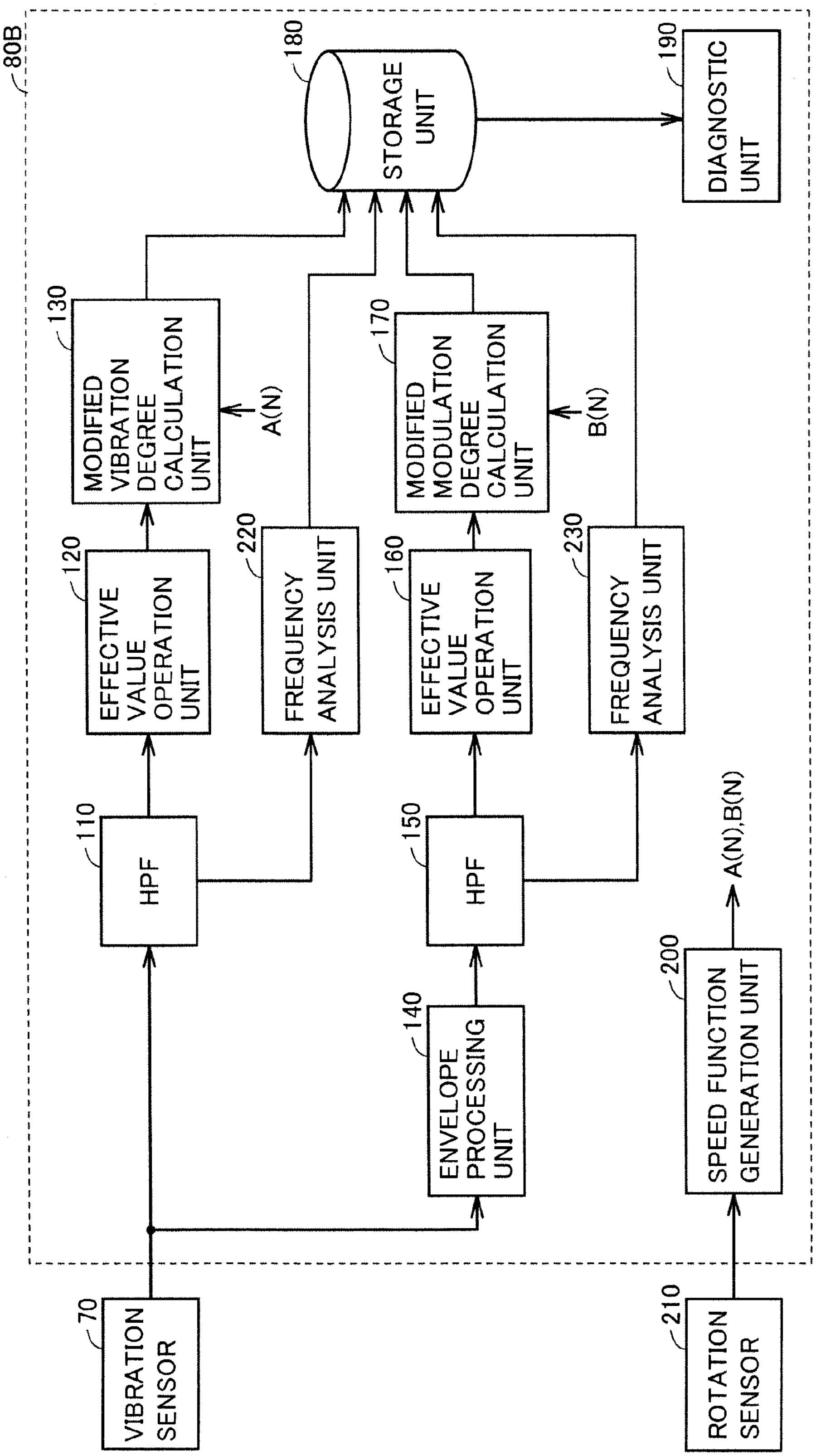
FIG. 10 is a functional block diagram functionally showing the configuration of a data processing device in a third embodiment.

FIG. 10 is a functional block diagram functionally showing the configuration of a data processing device 80B in the third embodiment. Referring to FIG. 10, data processing device 80B further includes frequency analysis units 220 and 230 in the configuration of data processing device 80A shown in FIG. 9.

Frequency analysis unit 220 receives, from HPF 110, the vibration waveform of bearing 60 with a DC component removed therefrom. Frequency analysis unit 220 then performs a frequency analysis on the received vibration waveform of bearing 60, and outputs the result of frequency analysis to storage unit 180. As an example, frequency analysis unit 220 performs fast Fourier transform (FFT) processing on the vibration waveform of bearing 60 received from HPF 110, and outputs a peak frequency exceeding a previously set threshold value, to storage unit 180.

Frequency analysis unit 230 receives, from HPF 150, the AC component of the envelope waveform with a DC component removed therefrom. Frequency analysis unit 230 then performs a frequency analysis on the received AC component of the envelope waveform, and outputs the result of frequency analysis to storage unit 180. As an example, frequency analysis unit 230 performs FFT processing on the AC component of the envelope waveform received from HPF 110, and outputs a peak frequency exceeding a previously set threshold value, to storage unit 180.

Diagnostic unit 190 then reads, from storage unit 180, the result of frequency analyses by frequency analysis units 220 and 230 together with modified vibration degree Vr* and modified modulation degree Ve*, and uses the result of frequency analyses together with the transition of time changes in modified vibration degree Vr* and modified modulation degree Ve*, thereby performing a more reliable abnormality diagnosis.

For example, the result of frequency analyses by frequency analysis units 220 and 230 can be used for presuming an abnormality occurring portion when an abnormality is detected by the abnormality diagnosis based on modified vibration degree Vr* and modified modulation degree Ve*. That is, when damage occurs within the bearing, the peak of vibrations will occur at a specific frequency theoretically determined from the geometric configuration within the bearing and the rotational speed depending on a damaged portion (inner ring, outer ring, rolling element). Therefore, an abnormality occurring portion can be diagnosed more correctly by using the result of frequency analyses by frequency analysis units 220 and 230 together with the abnormality diagnosis based on modified vibration degree Vr* and modified modulation degree Ve* described above.

It is noted that, in the above description, frequency analysis units 220 and 230 shall be added in the second embodiment, however, frequency analysis units 220 and 230 may be added to data processing device 80 in the first embodiment shown in FIG. 2.

As described above, according to this third embodiment, since the abnormality diagnosis through the frequency analysis is used together, the reliability of abnormality diagnosis can be increased further, and an abnormality occurring portion can be diagnosed more correctly.

[Fourth Embodiment]

In the fourth embodiment, to further increase the reliability of abnormality diagnosis of bearing 60, detected values of various sensors are used together.

Figure 11:
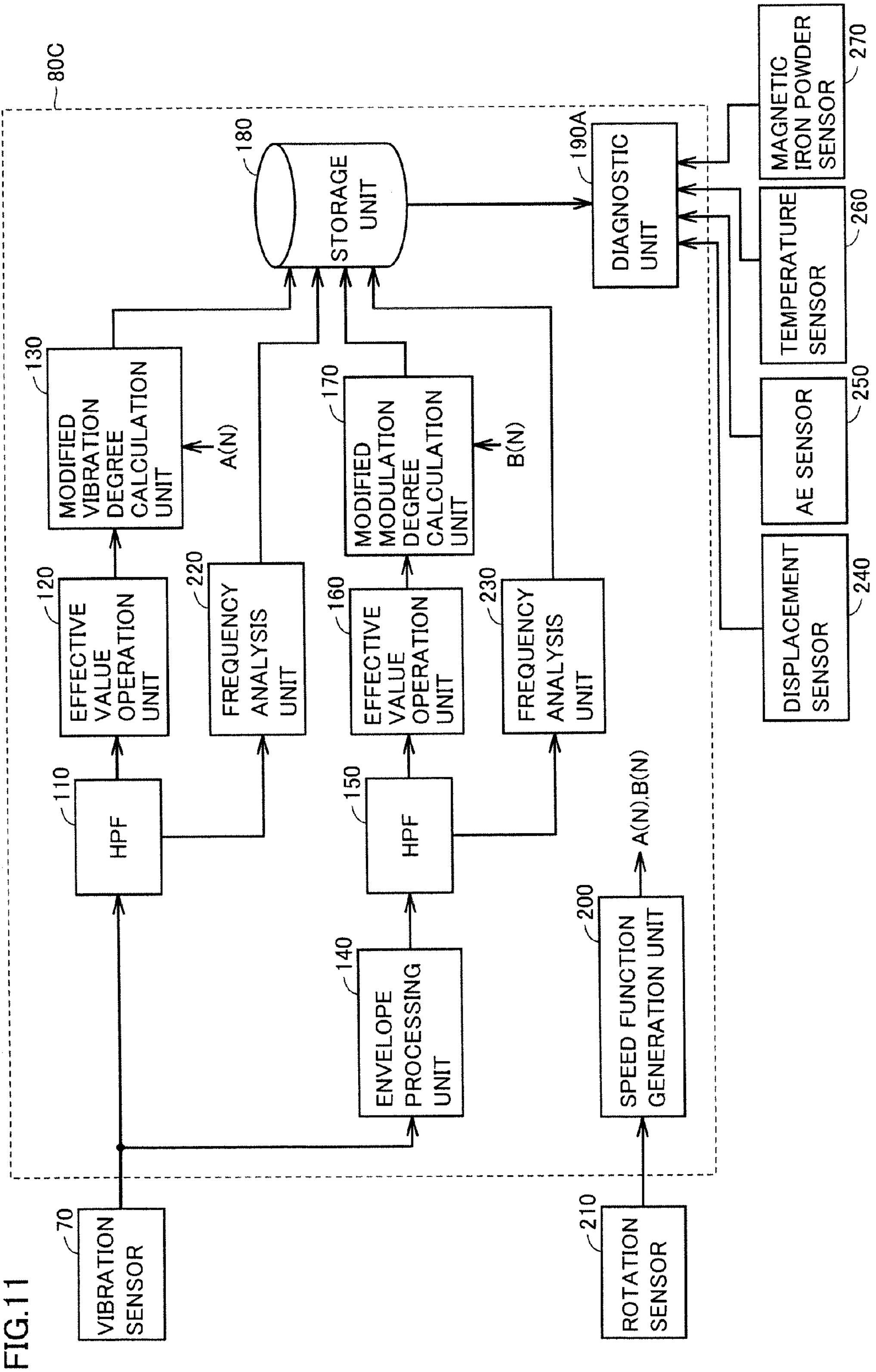
FIG. 11 is a functional block diagram functionally showing the configuration of a data processing device in a fourth embodiment.

FIG. 11 is a functional block diagram functionally showing the configuration of a data processing device 80C in the fourth embodiment. Referring to FIG. 11, data processing device 80C includes a diagnostic unit 190A in place of diagnostic unit 190 in the configuration of data processing device 80B shown in FIG. 10.

The wind turbine generation apparatus in this fourth embodiment is further provided with at least one of a displacement sensor 240, an AE (Acoustic Emission) sensor 250, a temperature sensor 260, and a magnetic iron powder sensor 270, in addition to vibration sensor 70 and rotation sensor 210. Diagnostic unit 190A receives a detected value from at least one of displacement sensor 240, AE sensor 250, temperature sensor 260, and magnetic iron powder sensor 270 provided. Diagnostic unit 190A also reads, from storage unit 180, modified vibration degree Vr* and modified modulation degree Ve* as well as the result of frequency analyses by frequency analysis units 220 and 230.

Then, diagnostic unit 190A performs an abnormality diagnosis of bearing 60 by using the detected value received from at least one of displacement sensor 240, AE sensor 250, temperature sensor 260, and magnetic iron powder sensor 270, together with modified vibration degree Vr* and modified modulation degree Ve* as well as the result of frequency analyses by frequency analysis units 220 and 230.

Displacement sensor 240 is attached to bearing 60, and detects a relative displacement of the inner ring with respect to the outer ring of bearing 60 for output to diagnostic unit 190A. It is difficult to detect an abnormality in overall abrasion of the rolling element surface with the above-described modified vibration degree Vr* and modified modulation degree Ve* as well as the frequency analysis technique through use of the detected value of vibration sensor 70, however, abrasion inside the bearing can be detected by detecting the relative displacement of the inner ring with respect to the outer ring by displacement sensor 240. When the detected value from displacement sensor 240 exceeds a previously set value, diagnostic unit 190A determines that an abnormality has occurred in bearing 60. It is noted that, since displacement sensor 240 detects the relative displacement between the outer ring and the inner ring, the accuracy of an unmeasured surface needs to be maintained at a high quality.

AE sensor 250 is attached to bearing 60, and detects an acoustic emission wave (AE signal) produced from bearing 60 for output to diagnostic unit 190A. This AE sensor 250 is superior in detection of internal crack of components constituting bearing 60, and by using AE sensor 250 together, it will be possible to detect at an early stage a delamination abnormality that would be caused by an internal crack difficult to detect by vibration sensor 70. When the number of times that the amplitude of the AE signal detected by AE sensor 250 exceeds a set value exceeds a threshold value or when the detected AE signal or a signal obtained by performing envelope processing on the AE signal exceeds a threshold value, diagnostic unit 190A determines that an abnormality has occurred in bearing 60.

Temperature sensor 260 is attached to bearing 60, and detects the temperature of bearing 60 for output to diagnostic unit 190A. Generally, a bearing generates heat due to poor lubrication, an excessively small clearance in the bearing or the like, and when experienced discoloration and/or softening adhesion of the rolling element surface to be brought into a burnt-out state, the bearing will be no longer able to rotate. Therefore, the temperature of bearing 60 is detected by temperature sensor 260, so that an abnormality such as poor lubrication can be detected at an early stage.

When modified vibration degree Vr* and modified modulation degree Ve* exhibit behaviors as shown in FIG. 8, diagnostic unit 190A further refers to the detected value from temperature sensor 260 to thereby diagnose an abnormality such as poor lubrication. It is noted that, when the detected value from temperature sensor 260 exceeds a previously set value, diagnostic unit 190A may determine that an abnormality has occurred in bearing 60 based on that fact alone.

It is noted that temperature sensor 260 is implemented by, for example, a thermistor, a platinum resistor, a thermocouple, or the like.

Magnetic iron powder sensor 270 detects the amount of iron powder contained in a lubricant for bearing 60, and outputs its detected value to diagnostic unit 190A. Magnetic iron powder sensor 270 consists of, for example, an electrode with a magnet built therein and a rod-like electrode, and is provided on a circulation path of the lubricant in bearing 60. Magnetic iron powder sensor 270 captures iron powder contained in the lubricant by the magnet, and outputs a signal when adhesion of iron powder causes an electric resistance between the electrodes to drop to a set value or below. That is, when the bearing is worn out, iron powder resulting from abrasion is mixed with the lubricant, and therefore, abrasion in bearing 60 can be detected by detecting the amount of iron powder contained in the lubricant in bearing 60 by magnetic iron powder sensor 270. Upon receipt of the signal from magnetic iron powder sensor 270, diagnostic unit 190A determines that an abnormality has occurred in bearing 60.

Although not particularly shown, an optical sensor that detects contamination of the lubricant in accordance with the light transmittance may be used in place of magnetic iron powder sensor 270. For example, the optical sensor directs light of a light emitting element to a grease to detect the amount of bearing abrasion powder in the grease in accordance with changes in intensity of light arrived at the light receiving element. It is noted that the light transmittance is defined by the ratio between an output value of the light receiving element in the state where there is no foreign substance mixed in the grease and an output value of the light receiving element when ferrous oxide has been mixed, and when the transmittance exceeds a set value, diagnostic unit 190A determines that an abnormality has occurred in bearing 60.

It is noted that although displacement sensor 240, AE sensor 250, temperature sensor 260, and magnetic iron powder sensor 270 are shown in FIG. 11, all of them are not necessarily be provided. The reliability of abnormality diagnosis can be increased by providing at least one of the sensors.

As described above, according to this fourth embodiment, since the detected values of various sensors are used together for an abnormality diagnosis, the reliability of abnormality diagnosis can be increased further. In particular, using displacement sensor 240 together allows abrasion inside the bearing to be diagnosed as well, and using AE sensor 250 together allows a delamination abnormality caused by an internal crack to be diagnosed at an early stage. Moreover, using temperature sensor 260 together allows an abnormality such as poor lubrication to be diagnosed at an early stage, and using magnetic iron powder sensor 270 or an optical sensor detecting contamination of the lubricant by the light transmittance allows an abrasion abnormality in bearing 60 to be diagnosed.

[Fifth Embodiment]

Since nacelle 90 (FIG. 1) is placed at a high position, it is essentially desirable to place the abnormality diagnostic device described above distant from nacelle 90 in consideration of maintainability of the device itself. However, transmitting the vibration waveform itself of bearing 60 measured by using vibration sensor 70 to a remote place requires transmission means having a high transmission rate, which results in cost increase. Moreover, considering that nacelle 90 is placed at a high position as described above, it is desirable to use wireless communications for communications means from nacelle 90 to the outside.

Therefore, in this fifth embodiment, calculation of modified vibration degree Vr* and modified modulation degree Ve* as well as frequency analysis processing (in the case of using the frequency analysis together) are performed in the data processing device provided in nacelle 90, and each piece of calculated data of modified vibration degree Vr*, modified modulation degree Ve* and the result of frequency analyses (peak frequencies) is transmitted wirelessly from nacelle 90 to the outside. The data transmitted wirelessly from nacelle 90 is received by a communications server connected to the Internet, and is transmitted to a diagnostic server through the Internet, so that an abnormality diagnosis of bearing 60 is performed.

Figure 12:
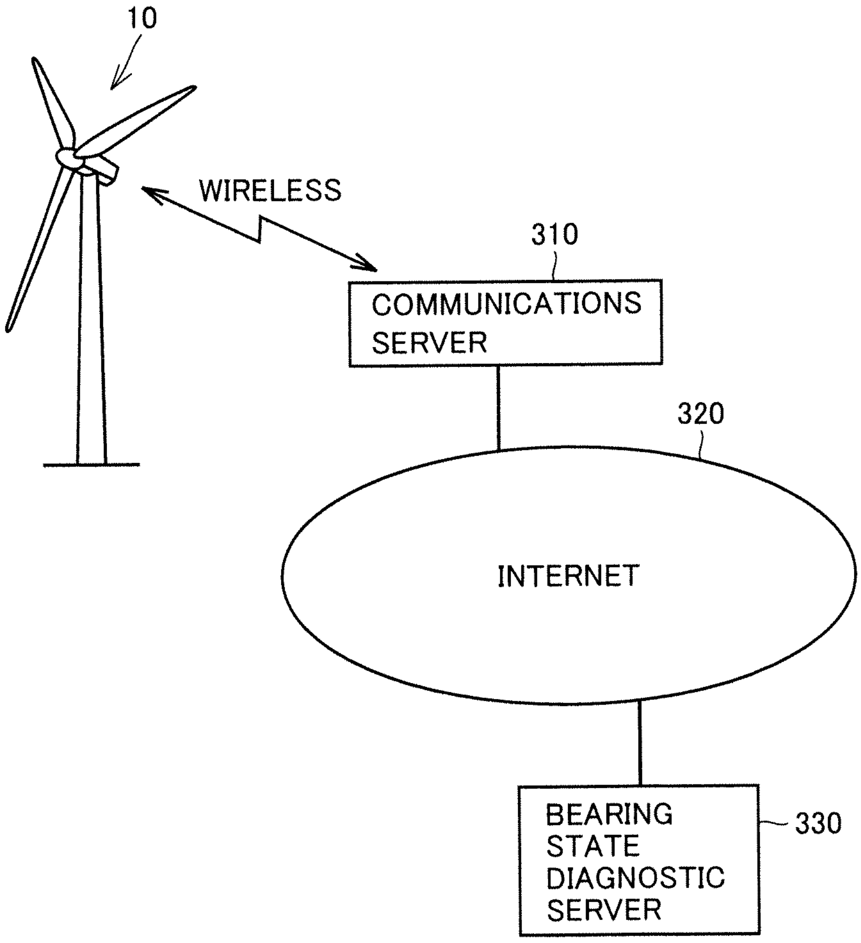
FIG. 12 is a diagram schematically showing the overall structure of an abnormality diagnostic system according to a fifth embodiment.

FIG. 12 is a diagram schematically showing the overall structure of an abnormality diagnostic system according to the fifth embodiment. Referring to FIG. 12, the abnormality diagnostic system includes wind turbine generation apparatus 10, a communications server 310, Internet 320, and a bearing state diagnostic server 330.

The structure of wind turbine generation apparatus 10 is as described with reference to FIG. 1. It is noted that the data processing device of wind turbine generation apparatus 10 in this fifth embodiment is provided with a wireless communications unit in place of the diagnostic unit, as will be described later. Wind turbine generation apparatus 10 calculates modified vibration degree Vr*, modified modulation degree Ve* and the result of frequency analyses (in the case of using the frequency analysis together) described above using the detected value of vibration sensor 70 (FIG. 1), and outputs the calculation results wirelessly to communications server 310.

Communications server 310 is connected to Internet 320. Communications server 310 receives the data transmitted wirelessly from wind turbine generation apparatus 10, and outputs the received data to bearing state diagnostic server 330 through Internet 320. Bearing state diagnostic server 330 is connected to Internet 320. Bearing state diagnostic server 330 receives the data from communications server 310 through Internet 320, and performs an abnormality diagnosis of bearing 60 (FIG. 1) provided for wind turbine generation apparatus 10 based on modified vibration degree Vr* and modified modulation degree Ve* as well as the result of frequency analyses (in the case of using the frequency analysis together) calculated in wind turbine generation apparatus 10.

Figure 13:
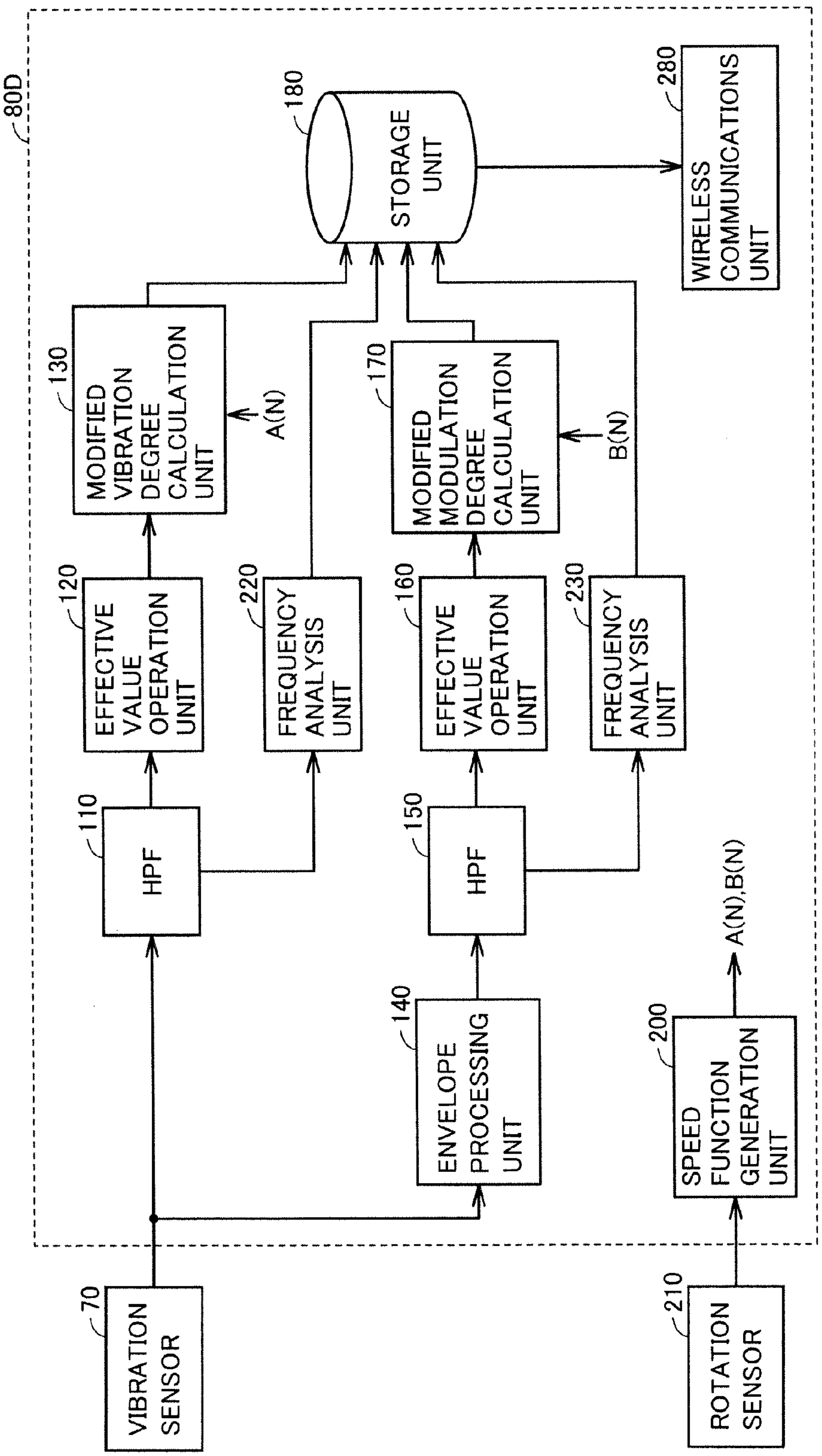
FIG. 13 is a functional block diagram functionally showing the configuration of a data processing device included in a wind turbine generation apparatus shown in FIG. 12.

FIG. 13 is a functional block diagram functionally showing the configuration of a data processing device 80D included in wind turbine generation apparatus 10 shown in FIG. 12. Referring to FIG. 13, data processing device 80D includes a wireless communications unit 280 in place of diagnostic unit 190 in the configuration of data processing device 80B shown in FIG. 10. Wireless communications unit 280 reads, from storage unit 180, modified vibration degree Vr* and modified modulation degree Ve* as well as the result of frequency analyses by frequency analysis units 220 and 230, and transmits the read data to communications server 310 (FIG. 12) wirelessly.

It is noted that the remaining configuration of data processing device 80D is identical to that of data processing device 80B shown in FIG. 10.

It is noted that, in the above description, wireless communications shall be made between nacelle 90 and communications server 310, however, it is also possible to establish a wired connection between nacelle 90 and communications server 310. Although wiring is required in this case, the need to provide a wireless communications device separately is eliminated, and more information can generally be transmitted through a wired connection, so that processing can be concentrated on a main substrate in nacelle 90.

Moreover, it is desirable to configure the abnormality diagnostic device described above independently of an existing power generation monitoring system. With such a configuration, initial costs of the abnormality diagnostic system can be reduced without having to add changes to the existing system.

As described above, according to this fifth embodiment, an abnormality diagnosis of the bearing provided in wind turbine generation apparatus 10 is performed in bearing state diagnostic server 330 provided at a remote place, which can reduce maintenance work and cost.

Moreover, although nacelle 90 is placed at a high position, resulting in a severe work environment, signal output from nacelle 90 is made wirelessly by providing wireless communications unit 280 and communications server 310, so that wiring work in nacelle 90 can be minimized, and wiring work in tower 100 that supports nacelle 90 is also unnecessary.

[Sixth Embodiment]

In this sixth embodiment, to perform an abnormality diagnosis of higher detection sensitivity, optimization of envelope processing in envelope processing unit 140 is accomplished in each of the above-described embodiments.

Figure 14:
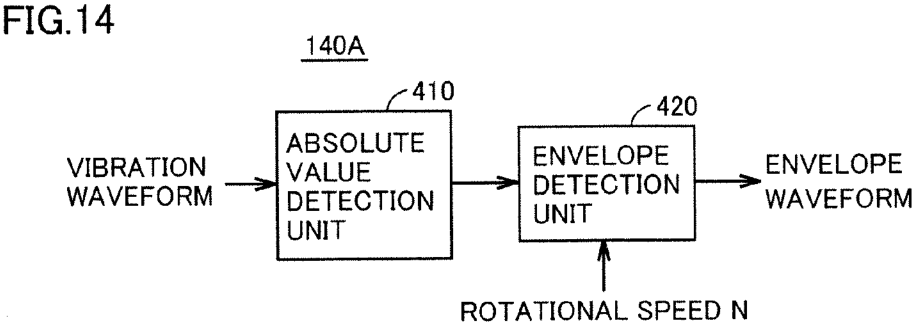
FIG. 14 is a functional block diagram of an envelope processing unit in a sixth embodiment.

FIG. 14 is a functional block diagram of an envelope processing unit in this sixth embodiment. Referring to FIG. 14, an envelope processing unit 140A includes an absolute value detection unit 410 and an envelope detection unit 420.

Absolute value detection unit 410 receives a detected value of vibrations of bearing 60 from vibration sensor 70, and outputs the absolute value of the received detection signal. Envelope detection unit 420 generates an envelope waveform of the vibration waveform of bearing 60 by performing attenuation processing with a predetermined time constant on the output signal from absolute value detection unit 410. Specifically, envelope detection unit 420 generates the envelope waveform using the following expression.

[Expression 3]

$$E[n] = \mathrm{Max}\left(|S[n]|, |S[n-1]|e^{-\frac{\Delta t}{\tau}}\right) \tag{5}$$

Herein, n indicates the number of a numerical value obtained by discretizing a continuous signal over time, E[n] indicates the n-th signal after envelope processing, Max (a, b) indicates a function of returning a larger one of a and b, |S[n]| indicates the n-th discretization signal of the output from absolute value detection unit 410, |S[n−1]| indicates the (n−1)th discretization signal, Δt indicates the discretization cycle, and τ indicates the time constant. This expression (5) is intended to attenuate the output by time constant τ from a peak value when a signal is input, and to attenuate the output from a new peak value when a signal exceeding the output is input. According to this expression (5), the envelope waveform can be generated by simple processing, and a signal with a large peak produced instantaneously by a delamination abnormality or the like can be left reliably.

Further, herein, envelope detection unit 420 sets time constant τ based on rotational speed N of main shaft 20 or bearing 60. If time constant τ that determines the envelope waveform has an excessively large value, the characteristics of an input signal (vibration waveform) will be removed, which is not preferable. On the other hand, if time constant τ is excessively small, a signal equivalent to an input signal (vibration waveform) will be output, which will not result in the envelope waveform. Therefore, it is necessary to set time constant τ at a suitable value.

Figure 15:
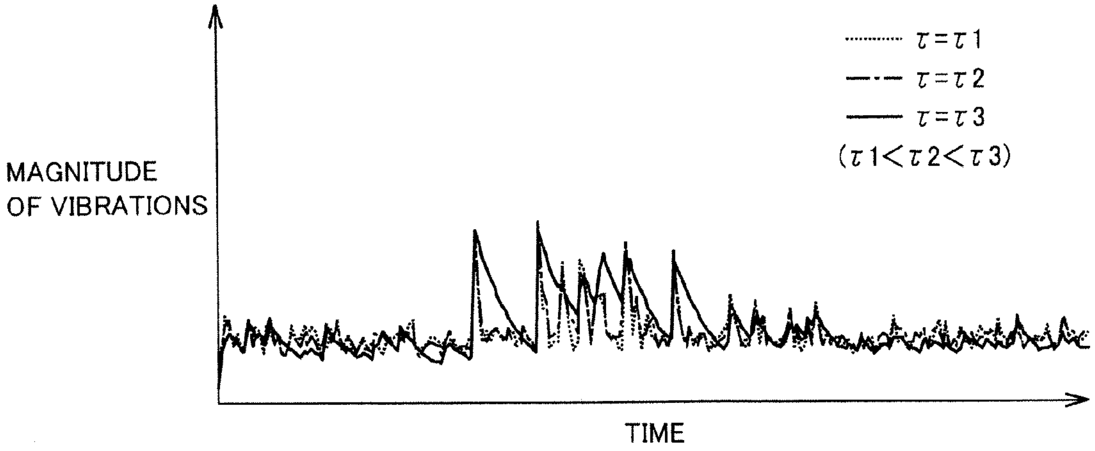
FIG. 15 is a diagram showing changes in envelope waveform when a time constant in envelope processing is changed.

FIG. 15 is a diagram showing changes in envelope waveform when time constant τ in envelope processing is changed. It is noted that this waveforms is of a signal having only an AC component with a DC component removed therefrom. Referring to FIG. 15, envelope waveforms obtained when time constant τ is set at τ1, τ2 and τ3 (τ1<τ2<τ3) for the same input signal (vibration waveform) are shown here. The horizontal axis indicates the time. It can be seen from FIG. 15 that as time constant τ is increased, the attenuation speed of envelope waveform decreases.

Figure 16:
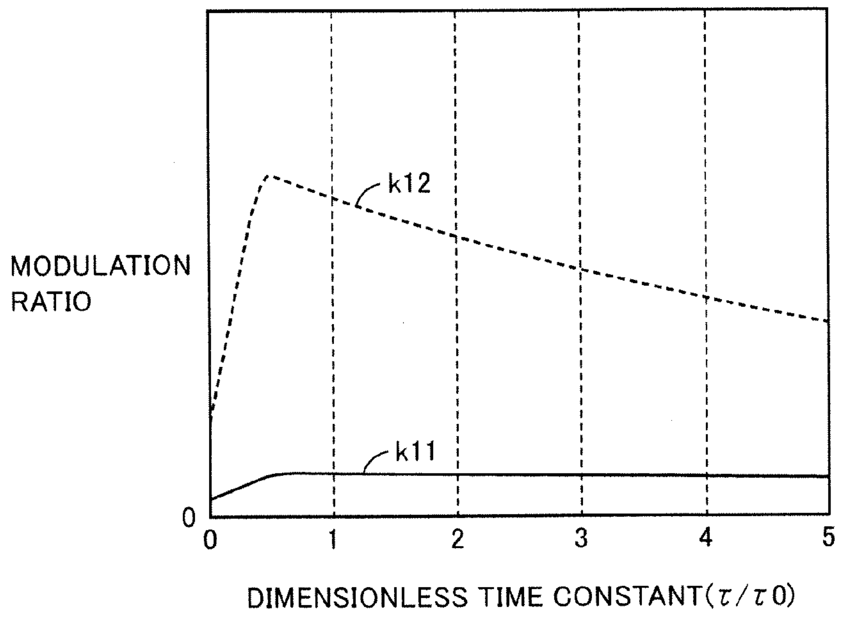
FIG. 16 is a diagram showing the relationship between a value obtained by dividing the modulation degree by the vibration degree and the time constant in envelope processing.

FIG. 16 is a diagram showing the relationship between a value obtained by dividing the effective value of the AC component of the envelope waveform (hereinafter also referred to as a "modulation degree") by the effective value of the vibration waveform (hereinafter also referred to as a "vibration degree") and the time constant in envelope processing. Referring to FIG. 16, the vertical axis indicates the modulation degree/the vibration degree (hereinafter also referred to as a "modulation ratio"). The horizontal axis indicates the dimensionless time constant (τ/τ0) obtained by dividing time constant τ by a passing cycle τ0 of a rolling element relative to a stationary ring (e.g., the outer ring) of bearing 60. It is noted that τ0 corresponds to the cycle of pulsed vibrations in the vibration waveform shown in FIG. 5, for example.

A curve k11 represents the modulation ratio of normal product in which no abnormality occurs in bearing 60, and a curve k12 represents the modulation ratio of abnormal product in which delamination occurs in the stationary ring of bearing 60. The occurrence cycle of pulsed vibrations when delamination occurs in the stationary ring will be the passing cycle of the rolling element relative to the stationary ring, namely, the time constant on the horizontal axis will be τ0. In this way, when delamination occurs, the modulation degree increases and the vibration degree less increases as described with reference to FIG. 5, so that the modulation ratio increases. To increase the sensitivity to detect delamination, a larger ratio of the modulation ratio of abnormal product to the modulation ratio of normal product is preferable.

Figure 17:
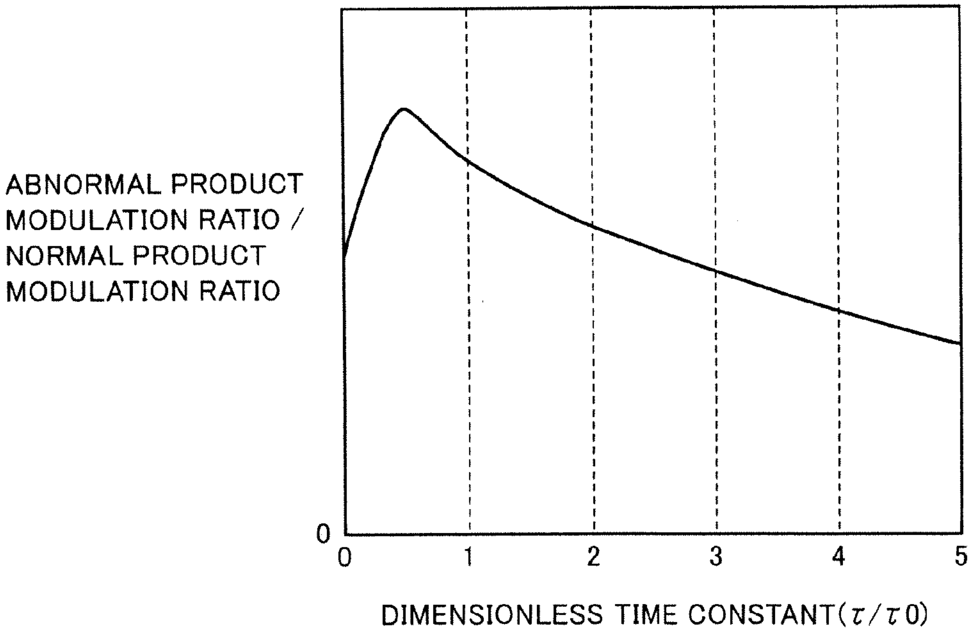
FIG. 17 is a diagram showing the relationship between the ratio of the modulation ratio of abnormal product (delamination) to the modulation ratio of normal product and the time constant in envelope processing.

FIG. 17 is a diagram showing the relationship between the ratio of the modulation ratio of abnormal product (delamination) to the modulation ratio of normal product and the time constant in envelope processing. Referring to FIG. 17, the horizontal axis indicates the dimensionless time constant. The ratio of the modulation ratio of abnormal product to the modulation ratio of normal product increases as the dimensionless time constant increases from 0, and decreases monotonously when the dimensionless time constant exceeds 0.5.

This result is considered as follows. That is, since the vibration waveform of normal product is a waveform in which equivalent vibrations continue in a short cycle as shown in FIG. 3, the modulation degree less changes even when the time constant in envelope processing is changed. Therefore, for a normal product, the modulation ratio less changes even when the time constant is changed (see curve k11 in FIG. 16).

On the other hand, for an abnormal product (delamination), the modulation ratio increases as the dimensionless time constant increases from 0, and decreases monotonously when the dimensionless time constant exceeds 0.5, as shown in FIG. 16. This is because, although the effective value of the AC component of the envelope waveform (modulation degree) increases as the time constant increases from 0 as presumed also from changes in envelope waveform associated with changes in time constant τ shown in FIG. 15, attenuation of the envelope waveform slows down when the dimensionless time constant exceeds 0.5, so that the effective value of the AC component of the envelope waveform (modulation degree) decreases.

It is noted that, when the dimensionless time constant is more than or equal to 1, information on the input signal (vibration waveform) will be impaired greatly. That is, since the envelope waveform has a low frequency, the waveform quality can be maintained even if the discretization cycle is made longer. The envelope waveform allows reduction in storage capacity, which is suitable for storing data. However, when the time constant is excessively large, the characteristics of an original vibration waveform can no longer be presumed from the envelope waveform. Therefore, the dimensionless time constant is preferably set at a value of more than or equal to 0.5 and less than or equal to 1. That is, time constant τ is preferably set to be more than or equal to 0.5 times passing cycle τ0 of the rolling element relative to the stationary ring of bearing 60 and less than or equal to passing cycle τ0.

Referring again to FIG. 14, envelope detection unit 420 sets time constant τ based on rotational speed N of main shaft 20 or bearing 60. That is, passing cycle τ0 can be calculated based on rotational speed N of main shaft 20 or bearing 60 and specifications of bearing 60. Therefore, envelope detection unit 420 calculates passing cycle τ0 based on rotational speed N and the specifications of bearing 60, and sets time constant τ in a range of more than or equal to 0.5 times calculated passing cycle τ0 and less than or equal to 1 (e.g., a value of 0.5 times τ0). It is noted that rotational speed N can be detected by rotation sensor 210 shown in FIG. 9 or the like.

It is noted that, in the above description, time constant τ shall be set based on passing cycle τ0 of the rolling element relative to the stationary ring since it is often in the stationary ring that delamination first occurs in bearing 60. When delamination is more likely to occur in the rolling element than in the stationary ring, time constant may be set based on the half cycle of rotation of the rolling element. That is, envelope detection unit 420 calculates the half cycle of rotation of the rolling element based on rotational speed N and the specifications of bearing 60, and time constant τ may be set in a range of more than or equal to 0.5 times the half cycle and less than or equal to 1 (e.g., a value of 0.5 times the half cycle of rotation). It is noted that the reason why the half cycle of rotation of the rolling element is used as a basis is because the rolling element contacts the raceway twice each time the rolling element rotates once.

As described above, according to this sixth embodiment, in which time constant in envelope processing is set based on rotational speed N of main shaft 20 or bearing 60, an abnormality diagnosis with a high detection sensitivity can be achieved even when rotational speed N changes.

It is noted that, referring to FIG. 1 again, vibration sensor 70 shall be attached to bearing 60 so that an abnormality diagnosis of bearing 60 shall be performed in each of the above-described embodiments, however, in addition to or in place of bearing 60, vibration sensors can be provided for the bearings provided in gearbox 40 and generator 50, so that an abnormality diagnosis of the bearings provided in gearbox 40 and generator 50 can be performed with a technique similar to that of each of the above-described embodiments.

It is noted that, in the above description, data processing devices 80 and 80A to 80C correspond to an example of "a processing unit" in the present invention, and effective value operation units 120 and 160 correspond to an example of "a first operation unit" and "a second operation unit" in the present invention, respectively. Moreover, data processing device 80D corresponds to an example of "a data processing unit" in the present invention, and bearing state diagnostic server 330 corresponds to an example of "a bearing abnormality diagnostic device" in the present invention.

It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST

10 wind turbine generation apparatus; 20 main shaft; 30 blade; 40 gearbox; 50 generator; 60 bearing; 70 vibration sensor; 80, 80A to 80D data processing device; 90 nacelle; 100 tower; 110, 150 HPF; 120, 160 effective value operation unit; 130 modified vibration degree calculation unit; 140, 140A envelope processing unit; 170 modified modulation degree calculation unit; 180 storage unit; 190, 190A diagnostic unit; 200 speed function generation unit; 210 rotation sensor; 220, 230 frequency analysis unit; 240 displacement sensor; 250 AE sensor; 260 temperature sensor; 270 magnetic iron powder sensor; 280 wireless communications unit; 310 communications server; 320 Internet; 330 bearing state diagnostic server; 410 absolute value detection unit; 420 envelope detection unit.

The invention claimed is:

1. An abnormality diagnostic device for a rolling bearing, comprising:

a vibration sensor for measuring a vibration waveform of the rolling bearing; and a processing unit for diagnosing an abnormality of said rolling bearing, said processing unit including:

a first operation unit calculating an effective value of said vibration waveform measured by using said vibration sensor, an envelope processing unit generating an envelope waveform of said vibration waveform by performing envelope processing on said vibration waveform measured by using said vibration sensor, a filter extracting an AC component of said envelope waveform generated by said envelope processing unit, a second operation unit calculating an effective value of the AC component of said envelope waveform extracted by said filter, and a diagnostic unit diagnosing the abnormality of said rolling bearing based on transition of time changes in the effective value of said vibration waveform calculated by said first operation unit and the effective value of the AC component of said envelope waveform calculated by said second operation unit.

2. The abnormality diagnostic device for a rolling bearing according to claim 1, further comprising a rotation sensor for detecting a rotational speed of one of a shaft supported by said rolling bearing and said rolling bearing, wherein said processing unit further includes a modified vibration degree calculation unit calculating a modified vibration degree obtained by normalizing, by said rotational speed, the effective value of said vibration waveform calculated by said first operation unit, and a modified modulation degree calculation unit calculating a modified modulation degree obtained by normalizing, by said rotational speed, the effective value of the AC component of said envelope waveform calculated by said second operation unit, and said diagnostic unit diagnoses the abnormality of said rolling bearing based on said modified vibration degree and said modified modulation degree.

3. The abnormality diagnostic device for a rolling bearing according to claim 2, wherein said diagnostic unit diagnoses the abnormality of said rolling bearing based on transition of time changes in said modified vibration degree and said modified modulation degree.

4. The abnormality diagnostic device for a rolling bearing according to claim 1, wherein said processing unit further includes a frequency analysis unit performing a frequency analysis on at least one of said vibration waveform and said envelope waveform, and said diagnostic unit further presumes an abnormal portion of said rolling bearing based on the result of analysis obtained by said frequency analysis unit.

5. The abnormality diagnostic device for a rolling bearing according to claim 1, wherein said vibration sensor includes an acceleration sensor.

6. The abnormality diagnostic device for a rolling bearing according to claim 1, further comprising a displacement sensor for detecting a relative displacement between an inner ring and an outer ring of said rolling bearing, wherein said diagnostic unit diagnoses the abnormality of said rolling bearing by further using a detected value of said displacement sensor.

7. The abnormality diagnostic device for a rolling bearing according to claim 1, further comprising a temperature sensor for measuring the temperature of said rolling bearing, wherein said diagnostic unit diagnoses the abnormality of said rolling bearing by further using a measured value of said temperature sensor.

8. The abnormality diagnostic device for a rolling bearing according to claim 1, further comprising a sensor for measuring the amount of impurities contained in a lubricant of said rolling bearing, wherein said diagnostic unit diagnoses the abnormality of said rolling bearing by further using a measured value of said sensor.

9. The abnormality diagnostic device for a rolling bearing according to claim 1, further comprising a rotation sensor for detecting a rotational speed of one of a shaft supported by said rolling bearing and said rolling bearing, wherein said envelope processing unit includes an absolute value detection unit outputting an absolute value of said vibration waveform, and an envelope detection unit generating said envelope waveform by performing attenuation processing with a predetermined time constant on an output signal from said absolute value detection unit, and said time constant is set based on said rotational speed.

10. The abnormality diagnostic device for a rolling bearing according to claim 9, wherein said time constant is set to be less than or equal to a half cycle of rotation of a rolling element in said rolling bearing.

11. The abnormality diagnostic device for a rolling bearing according to claim 10, wherein said time constant is set to be more than or equal to 0.5 times said half cycle.

12. The abnormality diagnostic device for a rolling bearing according to claim 9, wherein said time constant is set to be less than or equal to a passing cycle of a rolling element relative to a stationary ring of said rolling bearing.

13. The abnormality diagnostic device for a rolling bearing according to claim 12, wherein said time constant is set to be more than or equal to 0.5 times said passing cycle.

14. The abnormality diagnostic device for a rolling bearing according to claim 1, wherein the filter is a high pass filter (HPF) that removes a DC component of said generated envelope waveform, and the second operation unit calculates the effective value of the AC component of said envelope waveform having the DC component removed.

15. A wind turbine generation apparatus comprising:

a blade receiving wind force;

a main shaft connected to said blade;

a generator connected to one of said main shaft and a gearbox for accelerating rotation of said main shaft;

a plurality of rolling bearings provided in said main shaft, said gearbox and said generator; and an abnormality diagnostic device diagnosing an abnormality of at least one of said plurality of rolling bearings, said abnormality diagnostic device including a vibration sensor for measuring a vibration waveform of a rolling bearing to be diagnosed, and a processing unit for diagnosing an abnormality of the rolling bearing to be diagnosed, said processing unit including a first operation unit calculating an effective value of said vibration waveform measured by using said vibration sensor, an envelope processing unit generating an envelope waveform of said vibration waveform by performing envelope processing on said vibration waveform measured by using said vibration sensor, a filter extracting an AC component of said envelope waveform generated by said envelope processing unit, a second operation unit calculating an effective value of the AC component of said envelope waveform extracted by said filter, and a diagnostic unit diagnosing the abnormality of said rolling bearing based on transition of time changes in the effective value of said vibration waveform calculated by said first operation unit and the effective value of the AC component of said envelope waveform calculated by said second operation unit.

16. The wind turbine generation apparatus according to claim 15, wherein the filter is a high pass filter (HPF) that removes a DC component of said generated envelope waveform, and the second operation unit calculates the effective value of the AC component of said envelope waveform having the DC component removed.

17. An abnormality diagnostic system comprising:

a wind turbine generation apparatus;

an abnormality diagnostic device provided at a different position from said wind turbine generation apparatus; and a communications device for establishing communications between said wind turbine generation apparatus and said abnormality diagnostic device, said wind turbine generation apparatus including a blade receiving wind force, a main shaft connected to said blade, a generator connected to one of said main shaft and a gearbox for accelerating rotation of said main shaft, a plurality of rolling bearings provided in said main shaft, said gearbox and said generator, a vibration sensor for measuring a vibration waveform of at least one of said plurality of rolling bearings, and a data processing unit performing primary processing on the vibration waveform measured by using said vibration sensor, said data processing unit including:

a first operation unit calculating an effective value of said vibration waveform measured by using said vibration sensor, an envelope processing unit generating an envelope waveform of said vibration waveform by performing envelope processing on said vibration waveform measured by using said vibration sensor, a filter extracting an AC component of said envelope waveform generated by said envelope processing unit, and a second operation unit calculating an effective value of the AC component of said envelope waveform extracted by said filter, and said abnormality diagnostic device diagnosing an abnormality of a rolling bearing to be diagnosed based on transition of time changes in the effective value of said vibration waveform and the effective value of the AC component of said envelope waveform received from said data processing unit of said wind turbine generation apparatus through said communications device.

18. An abnormality diagnostic device for a rolling bearing comprising:

a vibration sensor for measuring a vibration waveform of the rolling bearing; and a processing unit for diagnosing an abnormality of said rolling bearing, said processing unit including:

a first filter removing a DC component of said vibration waveform measured by using said vibration sensor, a first operation unit calculating an effective value of said vibration waveform having the DC component removed by said first filter, an envelope processing unit generating an envelope waveform of said vibration waveform by performing envelope processing on said vibration waveform measured by using said vibration sensor, a second filter extracting an AC component of said envelope waveform generated by said envelope processing unit, a second operation unit calculating an effective value of the AC component of said envelope waveform extracted by said second filter, and a diagnostic unit diagnosing the abnormality of said rolling bearing based on the effective value of said vibration waveform calculated by said first operation unit and the effective value of the AC component of said envelope waveform calculated by said second operation unit.

* * * * *